United States Patent
Arnold (10) Patent No.: US 9,618,039 B2
(45) Date of Patent: Apr. 11, 2017

(54) SLEEVE BEARING WITH LUBRICANT RESERVOIRS

(71) Applicant: Caterpillar Inc., Peoria, IL (US)

(72) Inventor: Chad M. Arnold, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 38 days.

(21) Appl. No.: 14/613,000

(22) Filed: Feb. 3, 2015

(65) Prior Publication Data

US 2016/0223015 A1    Aug. 4, 2016

(51) Int. Cl.
| F16C 17/02 | (2006.01) |
| F16C 33/04 | (2006.01) |
| F16C 33/10 | (2006.01) |
| B23C 3/34  | (2006.01) |

(52) U.S. Cl.
CPC ............ *F16C 33/1065* (2013.01); *B23C 3/34* (2013.01); *F16C 17/02* (2013.01); *F16C 33/04* (2013.01); *F16C 33/1085* (2013.01); *B23C 2220/36* (2013.01); *B23C 2220/56* (2013.01)

(58) Field of Classification Search
CPC ........ F16C 17/02; F16C 33/06; F16C 33/102; F16C 33/1025; F16C 33/103; F16C 33/1045; F16C 33/106; F16C 33/1065; F16C 33/1085; F16C 33/04; B23C 3/34; B23C 2220/36; B23C 2220/56
See application file for complete search history.

(56) References Cited

U.S. PATENT DOCUMENTS

| 390,590 A | * | 10/1888 | Griswold | ............ F16C 33/1065 |
| | | | | 384/291 |
| 1,746,020 A | * | 2/1930 | Whiteley | ................ F16C 33/14 |
| | | | | 384/284 |
| 1,751,906 A | * | 3/1930 | Clark | ..................... B21D 53/00 |
| | | | | 29/898.059 |
| 3,343,893 A | * | 9/1967 | Hall | .................... F16C 33/1065 |
| | | | | 384/291 |

(Continued)

FOREIGN PATENT DOCUMENTS

| DE | 329985 C | * | 12/1920 | ............ F16C 17/026 |
| FR | 751198 A | * | 8/1933 | ............... F16C 17/18 |

(Continued)

*Primary Examiner* — Alan B Waits
(74) *Attorney, Agent, or Firm* — Leydig, Voit & Mayer, Ltd.

(57) ABSTRACT

A sleeve bearing comprising a tubular body having an inner surface annularly about a longitudinal axis and an outer surface radially outward from the inner surface. The sleeve bearing includes a first side surface between the inner surface and the outer surface, and a second side surface between the inner surface and the outer surface. The sleeve bearing includes a first inner edge between the first side surface and the inner surface, and a second inner edge between the second side surface and the inner surface. The sleeve bearing includes lubricant reservoirs in the inner surface elongated along an elongation axis. An angle between the elongation axis and the inner edge is between 0 and 90 degrees. The lubricant reservoirs are in an interrupted pattern annularly around the inner surface so a portion of the inner surface between the first inner edge and the second inner edge is uninterrupted.

14 Claims, 8 Drawing Sheets

(56) References Cited

U.S. PATENT DOCUMENTS

| | | | | |
|---|---|---|---|---|
| 4,105,267 A * | 8/1978 | Mori | ............... | F16C 33/1065 384/291 |
| 4,135,771 A | 1/1979 | Hüber et al. | | |
| 4,342,491 A * | 8/1982 | Jamison | ............ | F16C 33/1065 384/286 |
| 4,875,787 A * | 10/1989 | Bauer | ............... | F16C 17/08 384/127 |
| 6,095,690 A * | 8/2000 | Niegel | ............... | F16C 17/10 384/288 |
| 6,241,393 B1 * | 6/2001 | Georges | ............ | F16C 33/102 384/130 |
| 6,868,810 B2 * | 3/2005 | Hojo | ............... | F02B 61/02 123/54.4 |
| 6,991,377 B2 * | 1/2006 | Yamamoto | ............ | F16C 17/02 384/276 |
| 7,938,582 B2 * | 5/2011 | Barlerin | ............ | F16C 17/02 384/276 |
| 8,104,966 B2 * | 1/2012 | Yamamoto | ............ | F16C 17/02 384/292 |
| 8,708,567 B2 * | 4/2014 | Lee | ............... | F16C 17/02 384/293 |
| 9,222,511 B2 * | 12/2015 | Lee | ............... | F16C 33/103 |
| 2005/0163408 A1 * | 7/2005 | Wakabayashi | ........ | E02F 9/006 384/279 |
| 2010/0266230 A1 | 10/2010 | Hong | | |

FOREIGN PATENT DOCUMENTS

| | | | |
|---|---|---|---|
| FR | 2882409 A1 | 8/2006 | |
| JP | 2001-254739 A | 9/2001 | |
| JP | 3755737 B2 | 3/2006 | |
| JP | 4052730 B2 | 2/2008 | |
| JP | 2012-052582 A | 3/2012 | |
| WO | WO 2014/091123 A1 | 6/2014 | |

\* cited by examiner

SLEEVE BEARING WITH LUBRICANT RESERVOIRS

TECHNICAL FIELD

This patent disclosure relates generally to bearings and, more particularly to sleeve bearings for pin joints.

BACKGROUND

Various types of construction and mining machinery, such as tractors, backhoes, excavators, motor graders, and wheel loaders, commonly include linkage pin joints that allow for adjacent members of a linkage to pivot or rotate with respect to one another. The pins are commonly cylindrical in shape and, in some applications, are made from hardened steel. The pins are disposed through a pin joint where the two adjacent linkage members meet and provide a cylindrical bearing surface around which the members pivot.

Sleeve bearings are commonly disposed within the pin joints to provide an interior bearing surface between the linkage members and the pin. The sleeve bearings are frequently tubular in shape and can be press fit into the joints or secured by other suitable mechanisms. As the adjacent members of a linkage pivot with respect to one another, the pin's outer bearing surface bears against the inner surface of the sleeve bearing. It is important to keep the interface between the pin and the inner surface of the sleeve bearing well lubricated to limit part wear and the need for replacement parts.

U.S. Pat. No. 1,746,020 ("the '020 patent") describes one example of a bearing with recesses formed into the interior. More specifically, the '020 patent describes a bearing with recesses that have arcuate shaped bottoms and are aligned along with the rotation of a shaft disposed within the bearing. The bearing arrangement described in the '020 patent as well as in other bearings with interior recesses results in relatively high contact stresses concentrated at sharp corners of the recesses. Additionally, bearings like those described above often lack adequate balance of contact stresses, load distribution, and bearing support. This can result in increased wear rates resulting in frequent part replacement.

The inventors have created this background description to aid the reader and not to indicate that any of the indicated problems were themselves appreciated in the art. While the principles described in the disclosure can, in some respects and embodiments, alleviate the problems inherent in other systems, the scope of the invention is defined by the attached claims, and not by the ability of any disclosed feature to solve any specific problem noted herein.

SUMMARY

The disclosure describes, in one aspect, a sleeve bearing for a pin joint. The sleeve bearing comprises a tubular body having an inner portion, an outer portion, a first side portion, and a second side portion. The sleeve bearing includes a substantially cylindrical inner surface defined on the inner portion. The inner surface is disposed annularly about a longitudinal axis. The sleeve bearing includes a substantially cylindrical outer surface defined on the outer portion. The outer surface is disposed radially outward from and concentric with the inner surface. The sleeve bearing includes a first side surface defined on the first side portion and extending between the inner surface and the outer surface. The sleeve bearing includes a second side surface defined on the second side portion and extending between the inner surface and the outer surface. The sleeve bearing includes a first inner edge defined along a first inner interface between the first side surface and the inner surface. The sleeve bearing includes a second inner edge defined along a second inner interface between the second side surface and the inner surface such that the inner surface extends between the first inner edge and the second inner edge along the longitudinal axis. The sleeve bearing also includes a plurality of elongate lubricant reservoirs formed into the inner surface. The lubricant reservoirs are elongated along an elongation axis. A reservoir orientation angle defined between the elongation axis and the first inner edge is in a range between 0 degrees and 90 degrees. The plurality of lubricant reservoirs are disposed in an interrupted pattern annularly around the inner surface such that a portion of the inner surface along the longitudinal axis between the first inner edge and the second inner edge is uninterrupted by any of the plurality of lubricant reservoirs.

The disclosure describes, in another aspect, a sleeve bearing for a pin joint. The sleeve bearing comprises a tubular body having an inner portion, an outer portion, a first side portion, and a second side portion. The sleeve bearing includes a substantially cylindrical inner surface defined on the inner portion. The inner surface is disposed annularly about a longitudinal axis. The sleeve bearing includes a substantially cylindrical outer surface defined on the outer portion. The outer surface is disposed radially outward from and concentric with the inner surface. The sleeve bearing includes a first side surface defined on the first side portion and extending between the inner surface and the outer surface. The sleeve bearing includes a second side surface defined on the second side portion and extending between the inner surface and the outer surface. The sleeve bearing includes a first inner edge defined along a first inner interface between the first side surface and the inner surface. The sleeve bearing includes a first outer edge defined along a first outer interface between the first side and the outer surface. The sleeve bearing includes a second inner edge defined along a second inner interface between the second side surface and the inner surface such that the inner surface extends between the first inner edge and the second inner edge along the longitudinal axis. The sleeve bearing includes at least one lubricant orifice formed through the body between the outer surface and the inner surface. The sleeve bearing includes an inner lubricant channel formed into the inner surface, the inner circumference being substantially aligned with the first and second inner edges. The sleeve bearing includes an outer lubricant channel formed into the outer surface and concentric with the inner lubricant channel. The outer circumference being substantially aligned with the first outer edge. The sleeve bearing includes at least one lubricant orifice formed between the outer lubricant channel and the inner lubricant channel so as to provide fluid communication between the outer lubricant channel and the inner lubricant channel. The sleeve bearing also includes a plurality of elongate lubricant reservoirs formed into the inner surface. The lubricant reservoirs are elongated along an elongation axis. A reservoir orientation angle defined between the elongation axis and the first inner edge is in a range between 0 degrees and 90 degrees. The plurality of lubricant reservoirs are disposed in an interrupted pattern annularly around the inner surface such that a portion of the inner surface along the longitudinal axis between the first inner edge and the second inner edge and a portion of the inner surface along an inner circumference of the inner surface is uninterrupted by any of the plurality of lubricant reservoirs.

In another aspect, the disclosure describes a method of forming a sleeve bearing. The method comprises providing a tubular body including a cylindrical inner surface disposed annularly around a longitudinal axis surrounding a pin hole. The body includes a cylindrical outer surface disposed radially outward from and substantially concentric with the inner surface, and a first side surface and a second side surface, the first and second side surfaces each extending between the inner and outer surfaces. The body includes a first inner edge defined along a first inner interface between the first side surface and the inner surface, and a second inner edge defined along a second inner interface between the second side surface and the inner surface. The method includes inserting a tool axially into the pin hole. The method also includes forming an interrupted pattern of a plurality of elongate lubricant reservoirs by repeatedly: plunging the tool radially into the inner surface to a reservoir depth between the inner surface and the outer surface, moving the tool along an arced elongation axis so as to elongate the lubricant reservoir while maintaining the reservoir depth, and removing the tool radially out of the inner surface. A reservoir orientation angle defined between the elongation axis and the first inner edge is in a range between 0 degrees and 90 degrees. The plurality of lubricant reservoirs are disposed annularly around the inner surface such that a portion of the inner surface along the longitudinal axis between the first inner edge and the second inner edge is uninterrupted by any of the plurality of lubricant reservoirs.

DETAILED DESCRIPTION

Figure 1:
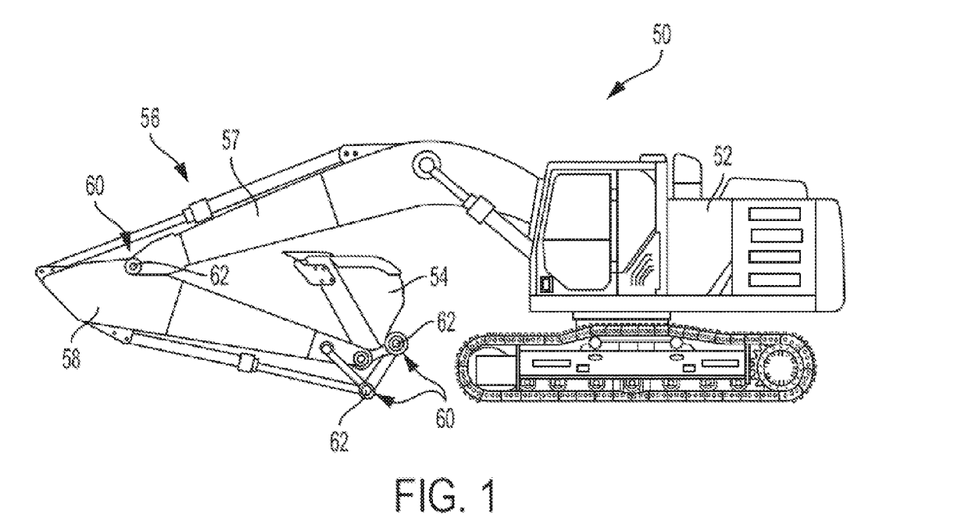
FIG. 1 is a side view of an exemplary machine including a plurality of linkage pin joints comprising a sleeve bearing in accordance with the present disclosure.

This disclosure generally relates to a sleeve bearing for use in linkage pin joints and, more particularly, to sleeve bearings that have elongate lubricant reservoirs disposed on an inner surface in an interrupted and distributed pattern. With respect to FIG. 1 of the drawings, an exemplary machine 50 that can include the sleeve bearing of the present disclosure is shown. Although FIG. 1 shows an embodiment of a machine 50 in the form of a hydraulic excavator, it is contemplated herein that the sleeve bearing of the present disclosure can be utilized in any machine or application implementing a pin joint. The machine 50 includes a body 52, a bucket 54, and a linkage system 56 connecting the bucket to the body. The linkage system 56 can include a plurality of linkage members 57, 58 that can pivot with respect to one another or with respect to the bucket 54 about pin joints 60. In each exemplary pin joint 60, the adjacent linkage members 57, 58 can pivot about a pin 62 bearing against a sleeve bearing.

Figure 2:
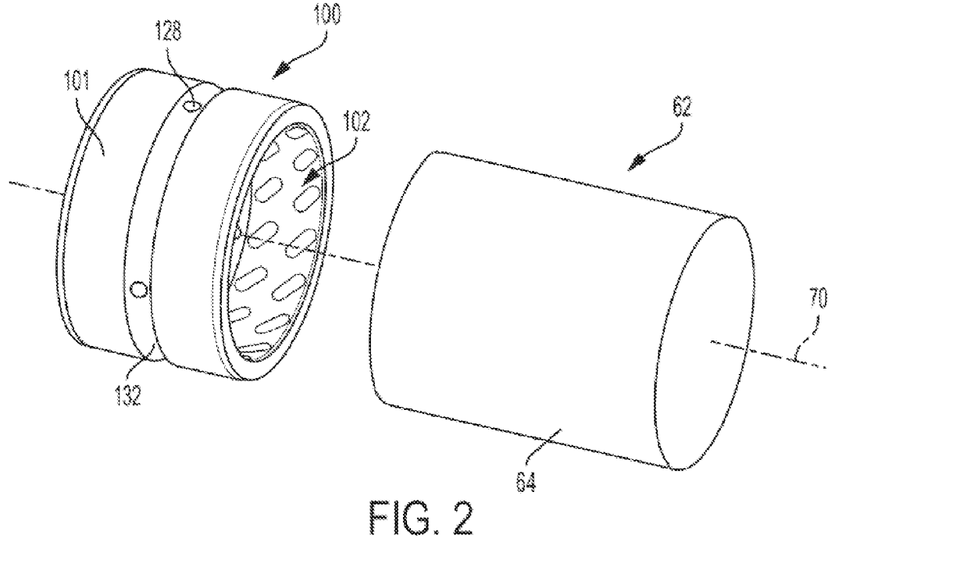
FIG. 2 is an exploded perspective view of a sleeve bearing in accordance with the present disclosure with an exemplary pin for a pin joint.

FIG. 2, shows an exploded view of an exemplary pin 62 used in a pin joint 60 in relation to an embodiment of a sleeve bearing 100 of the present disclosure. Although not explicitly shown on the machine 50 in FIG. 1, the sleeve bearing 100 can be press fit or otherwise secured into each respective pin joint 60. The pin 62 and the sleeve bearing 100 are both aligned along a longitudinal axis 70 running through the center of both the pin and the sleeve bearing. The pin 62 is substantially cylindrical in shape and includes a cylindrical outer bearing surface 64. The pin 62 is configured to fit within a pin hole 102 formed through a body 101 of the sleeve bearing 100 such that, as the pin rotates within the sleeve bearing, the outer bearing surface 64 bears against the interior of the sleeve bearing. Depending on the nature of the work being performed by a the machine 50 or the arrangement of the load manipulated by the bucket 54 or other machinery implement, the level and direction of the stresses encountered at the interface between the pin and the sleeve bearing 100 can vary. Due to the high loads carried by the pin joints 60, it can be important to ensure that the interface between the pin 62 and the sleeve bearing 100 remains well lubricated throughout use to limit wear and frequency of part failure. The sleeve bearing 100 can be made from any number of suitable materials, such as steel, copper alloys, heat treated steel (such as nitrided steel, carburized steel, or direct hardened steel) or a variety of other suitable combinations of materials and heat treatment methods. Any suitable lubricant can be used to lubricate the interface between the sleeve bearing 100 and the pin 62, such as grease, oil, or other suitable lubricants.

Figure 3:
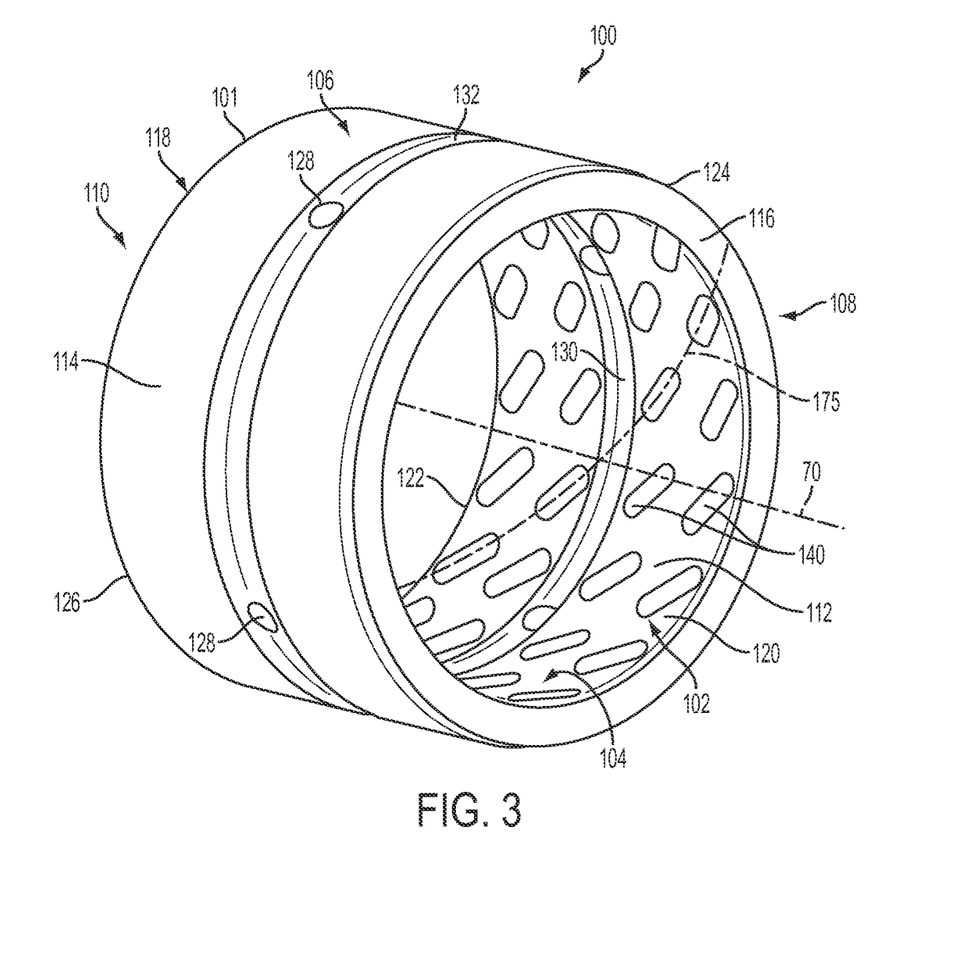
FIG. 3 is a perspective view of a sleeve bearing in accordance with the present disclosure.
Figure 4:
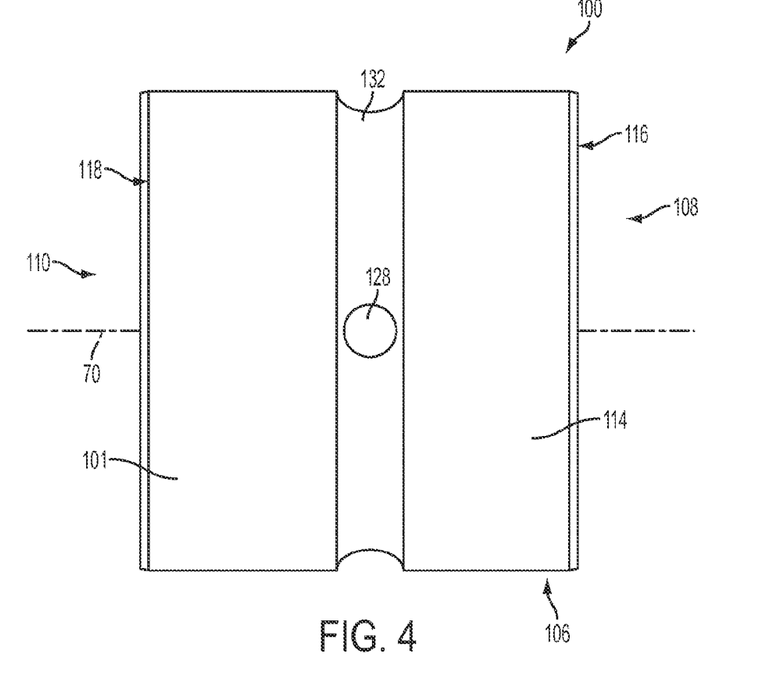
FIG. 4 is a front view of the sleeve bearing of FIG. 3.
Figure 5:
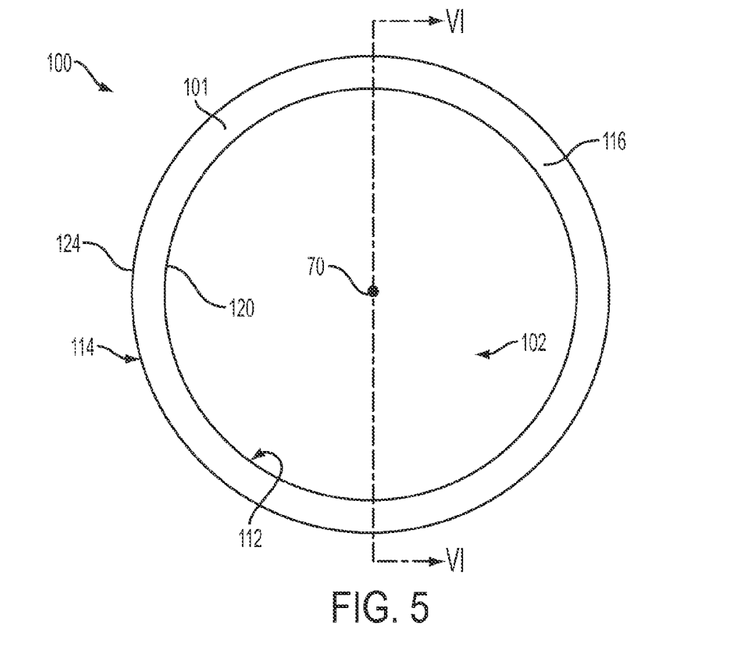
FIG. 5 is a right side view of the sleeve bearing of FIG. 3.

FIGS. 3-5 show various views of the sleeve bearing 100. The sleeve bearing 100 comprises a tubular body 101 forming a pin hole 102 through its center along a longitudinal axis 70. The body 101 includes an inner portion 104, an outer portion 106, a first side portion 108, and a second side portion 110. A substantially cylindrical inner surface 112 can be defined on the inner portion 104. The inner surface 112 surrounds the pin hole 102 and extends annularly about the longitudinal axis 70. A substantially cylindrical outer surface 114 can be defined on the outer portion 106. The outer surface 114 can be disposed radially outward from the inner surface 112 and can be substantially concentric with the inner surface. The sleeve bearing 100 can also include a first side surface 116 defined on the first side portion 108 of the body 101. The first side surface 116 extends between the inner surface 112 and the outer surface 114. A second side surface 118 can be defined on the second side portion 110 opposite the first side surface 116. The second side surface 118 also extends between the inner surface 112 and the outer surface 114. In some embodiments, the first and second side surfaces 116, 118 can each be substantially perpendicular to both the inner and outer surface 112, 114. The first and second side surfaces 112, 114 each form a substantially flat, annular ring around the longitudinal axis 70 and define a thickness of the body 101 between the inner surface and the outer surface 114.

The sleeve bearing 100 can also include a first inner edge 120, a second inner edge 122, a first outer edge 124, and a second outer edge 126. Each of the respective edges can be substantially circular about the longitudinal axis 70. The first inner edge 120 can be defined along a first inner interface between the first side surface 116 and the inner surface 112, and can represent an inner circumference of the inner surface. The second inner edge 122 can be defined along a second inner interface between the second side surface 118 and the inner surface 112 such that the inner surface extends between the first inner edge 120 and the second inner edge along the longitudinal axis 70. The first outer edge 124 can be defined along a first outer interface between the first side surface 116 and the outer surface 114, and can represent an outer circumference of the outer surface. The second outer edge 126 can be defined along a second outer interface between the second side surface 118 and the outer surface 114. In some embodiments, the first and second inner edges 120, 122 can have substantially equal diameters, and the first and second outer edges 124, 126 can have substantially equal diameters and be concentric with the first and second inner edges, respectively. Further, in some embodiments, the first and second inner edges 120, 122 and first and second outer edges 124, 126 can be beveled, rounded, or pointed, as desired.

In some embodiments, the sleeve bearing 100 can include at least one lubricant orifice 128 formed through the body between the outer surface 114 and the inner surface 116. Although the sleeve bearing 100 illustrated in FIGS. 3-6 includes four cylindrical lubricant orifices 128 disposed substantially a quarter way around the body 101 from one another, it is contemplated that any suitable number of lubricant orifices can be used in other embodiments. The lubricant orifices 128 allow a lubricant applied via a nozzle or access orifice to flow through the body 101 from the outer surface 114 to the inner surface 112 to be deposited in the interface between the pin 62 and the inner surface of the sleeve bearing. Further, some embodiments of the sleeve bearing 100 can include at least one inner lubricant channel 130 formed into the inner surface 112 and aligned substantially along an inner circumference of the inner surface. As described above, the inner circumference can be substantially aligned with the first and second inner edges 120, 122. The sleeve bearing 100 can also include at least one outer lubricant channel 132 formed into the outer surface 114 and concentric with the inner lubricant channel 130. The outer lubricant channel 130 can be aligned substantially along an outer circumference of the outer surface. As described above, the outer circumference can be defined as substantially aligned with the first outer edge 124. The inner and outer lubricant channels 130, 132 shown in the embodiments of FIGS. 3-6 are formed so as to be substantially rounded; however, inner and outer lubricant channels with other cross-sectional shapes are contemplated herein as well.

The outer lubricant channel 132 provides an avenue for lubricant provided to the outer surface 114 to travel around the outer circumference of the sleeve bearing 100. In some embodiments, the lubricant orifices 128 are formed through the body 101 between the outer lubricant channel 132 and the inner lubricant channel 130 so as to provide fluid communication between the outer lubricant channel and the inner lubricant channel. Once the lubricant passes through the lubricant orifices 128 into the inner lubricant channel 130, the inner lubricant channel can provide an avenue for the lubricant to travel around the inner circumference of the sleeve bearing 100 and coat the entirety of the interface between the pin bearing surface 64 and the inner surface 112.

Referring now to FIG. 3, a plurality of elongate lubricant reservoirs 140 can be formed into the inner surface 112 of the sleeve bearing 100 in an interrupted pattern. Each lubricant reservoir 140 is elongated from end to end along an elongation axis 175, with a reservoir length that is greater than a reservoir width. The lubricant reservoirs 140 act to hold lubricant within the inner surface 112 of the sleeve bearing 100. As a pin 62 rotates within the sleeve bearing 100 against the inner surface 112, lubricant can be wicked or drawn out of the lubricant reservoirs 140 to help create a lubricating layer between the inner surface and the pin. Additional lubricant incoming from the lubricant orifices 128 and inner lubricant channel 130 can help refill the lubricant reservoirs 140.

Figure 6:
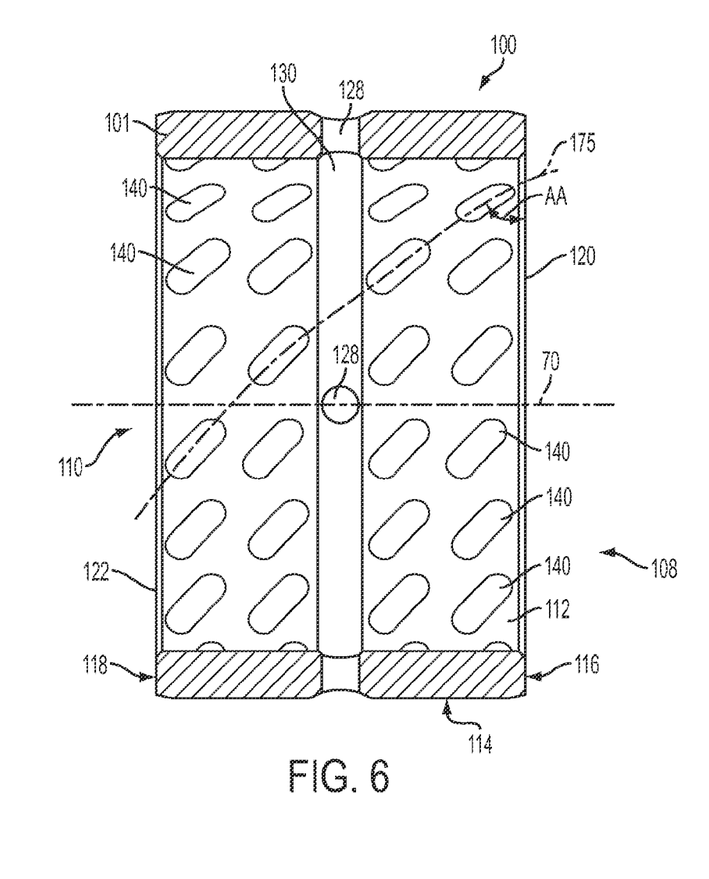
FIG. 6 is a front sectional view of the sleeve bearing of FIG. 3 as indicated in FIG. 5.

The elongation axis 175 is substantially arced at a transverse angle across the inner surface 112 of the sleeve bearing 100. Due to the arc of the elongation axis 175, each lubricant reservoir 140 can have a substantially uniform depth with respect to the inner surface 112. As best shown in FIG. 6, a reservoir orientation angle AA can be defined as the acute angle formed between the elongation axis 175 and the first inner edge 120. In some embodiments, the reservoir orientation angle AA can be in a range between 0 degrees and 90 degrees. In other embodiments, the reservoir orientation angle AA can be in a range between about 15 degrees and about 75 degrees, and in a range between about 30 degrees and about 60 degrees in other embodiments. In some embodiments, the reservoir orientation angle AA can be in a range between about 40 degrees and about 50 degrees. In some embodiments, the reservoir orientation angle AA can be about 45 degrees, and be about 30 degrees in other embodiments, and be about 60 degrees in yet other embodiments. The value of the reservoir orientation angle can be set depending on the application and performance desired. For example, a reservoir orientation angle AA approaching 90 degrees can present minimum reservoir area along the direction of a rotating pin, but can supply lubricant to a maximum width of the pin bearing surface. In contrast, a reservoir orientation angle AA approaching 0 degrees can present maximum reservoir area along the direction of pin rotation, but can supply lubricant to a minimum width of the pin bearing surface.

The plurality of lubrication reservoirs 140 can be disposed around the inner surface 112 in an interrupted, annular pattern. In some embodiments, such as the embodiment shown in FIGS. 3 and 4, the lubrication reservoirs 140 can be disposed in rows substantially aligned along the longitudinal axis 70 with portions of the inner surface 112 between each adjacent pair of reservoirs. Thus, in such embodiments, portions of the inner surface 112 along the longitudinal axis 70 between the first inner edge 120 and the second inner edge 122are uninterrupted by any of the plurality of lubricant reservoirs 140. In such embodiments, support for the rotating pin is supply across the entire width of the inner surface 112 along the longitudinal axis 70. Similarly, in some embodiments, the lubrication reservoirs 140 can be disposed in annular rows about the entire circumference of the inner surface 112 with portions of the inner surface between each adjacent pair of reservoirs. Thus, in such embodiments, portions of the inner surface 112 are uninterrupted by any of the plurality of lubricant reservoirs 140 along the inner circumference of the inner surface substantially aligned with the first and second inner edges 120, 122. In such embodiments, support is provided to the along the interface between the pin and the inner surface 112 all along the inner circumference.

Figure 7:
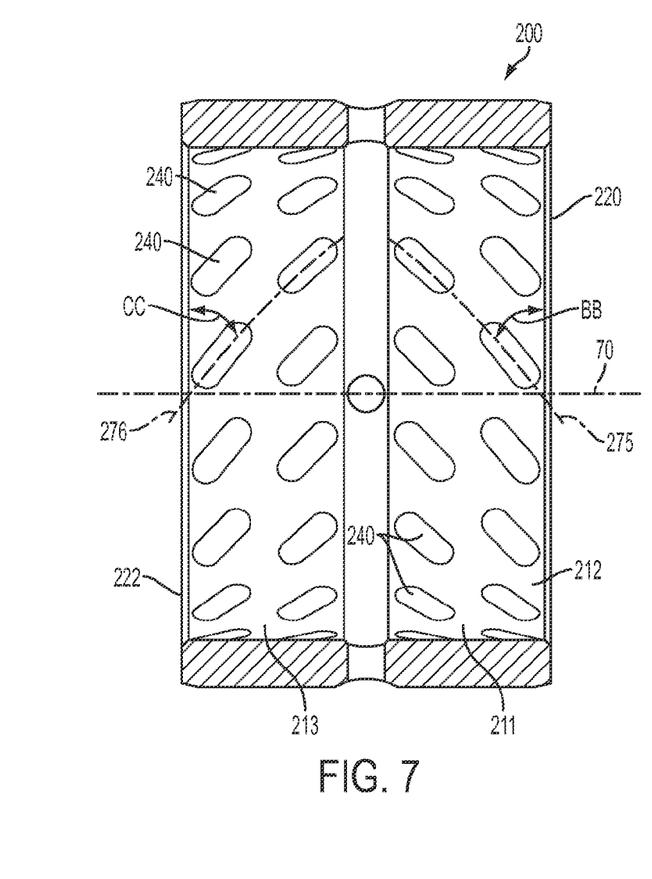
FIG. 7 is a front sectional view of an alternative embodiment of a sleeve bearing in accordance with the present disclosure.
Figure 8:
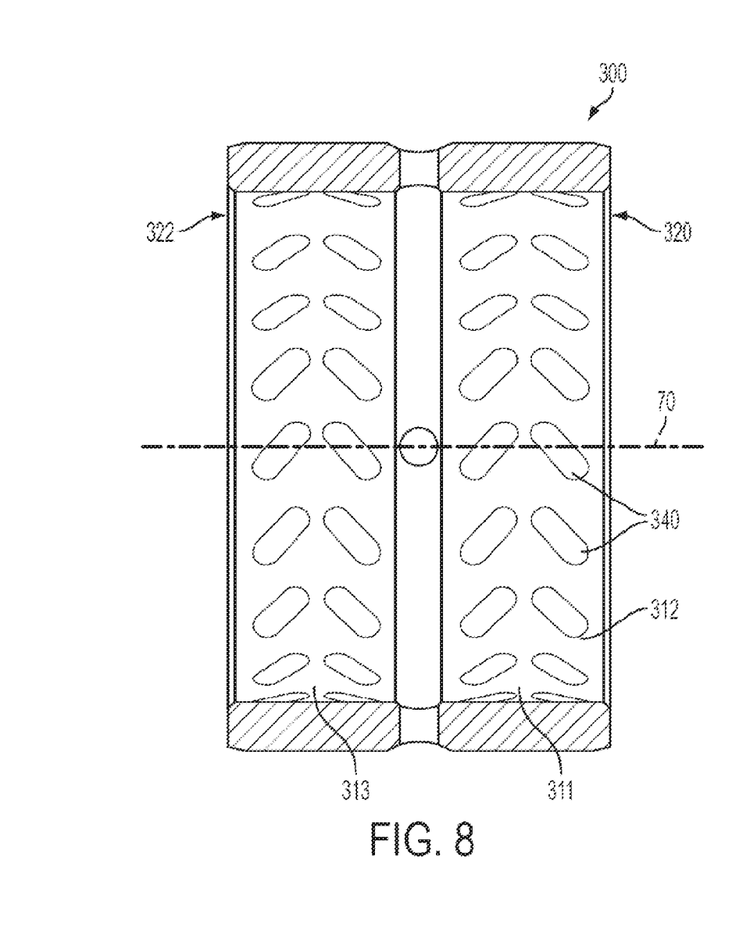
FIG. 8 is a front sectional view of another alternative embodiment of a sleeve bearing in accordance with the present disclosure.

In the embodiment of the sleeve bearing 100 shown in FIGS. 3 and 6, all of the lubricant reservoirs 140 are separated in an interrupted pattern longitudinally, annularly, and along the elongation axis 175. FIGS. 7 and 8 shows embodiments of a sleeve bearings 200, 300 with alternative patterns of lubricant reservoirs 240, 340. It should be understood that, unless otherwise noted, the sleeve bearings 200, 300 shown in FIGS. 7 and 8 include similar features to the sleeve bearing 100 described above with reference to FIGS. 3-6.

The inner surface 212 of the sleeve bearing 200 in FIG. 7 includes a first portion 211 adjacent a first inner edge 220 and a second portion 213 adjacent a second inner edge 222. In such an embodiment, the pattern of lubricant reservoirs 240 is substantially mirrored between the first and second portions 211, 213 of the inner surface 212. Specifically, the lubricant reservoirs 240 formed into the first portion 211 of the inner surface 212 are elongated substantially along a first elongation axis 275, and the lubricant reservoirs formed into the second portion 213 are elongated substantially along a second elongation axis 276. A first reservoir orientation angle BB is defined between the first elongation axis 275 and the first inner edge 220, and a second reservoir orientation angle CC is defined between the second elongation axis 276 and the second inner edge 222. In some embodiments, the first reservoir orientation angle BB can be substantially identical to the second reservoir orientation angle CC. In some embodiments, the first and second reservoir orientation angles BB, CC can be in a range between 0 degrees and 90 degrees. In other embodiments, the first and second reservoir orientation angles BB, CC can be in a range between about 15 degrees and about 75 degrees, and in a range between about 30 degrees and about 60 degrees in other embodiments. In some embodiments, the first and second reservoir orientation angles BB, CC can be in a range between about 40 degrees and about 50 degrees. In some embodiments, the first and second reservoir orientation angles BB, CC can be about 45 degrees, and be about 30 degrees in other embodiments, and be about 60 degrees in yet other embodiments.

Referring now to FIG. 8, the inner surface 312 of the sleeve bearing 300 includes a first portion 311 adjacent a first inner edge 320, and a second portion 313 adjacent a second inner edge 322. The pattern of lubricant reservoirs 340 on each of the first and second portions 311, 313 of the inner surface 312 is arranged in a chevron-like manner. In such an embodiment, the orientation of the lubricant reservoirs 340 along an elongation axis is substantially mirrored between the first and second portions 311, 313 of the inner surface 312. Further, adjacent annular rows of lubricant reservoirs 340 formed in the first portion 311 mirror one another, and adjacent annular rows of lubricant reservoirs formed in the second portion 313 mirror one another.

In any of the distributed patterns of lubricant reservoirs described herein, it should be understood that any number of longitudinal or annular rows of lubricant reservoirs can be used. For example, although each illustrated embodiment included only four annular rows of lubricant reservoirs, it is contemplated herein that more or fewer rows may be used in other embodiments of the sleeve bearing.

Figure 9:
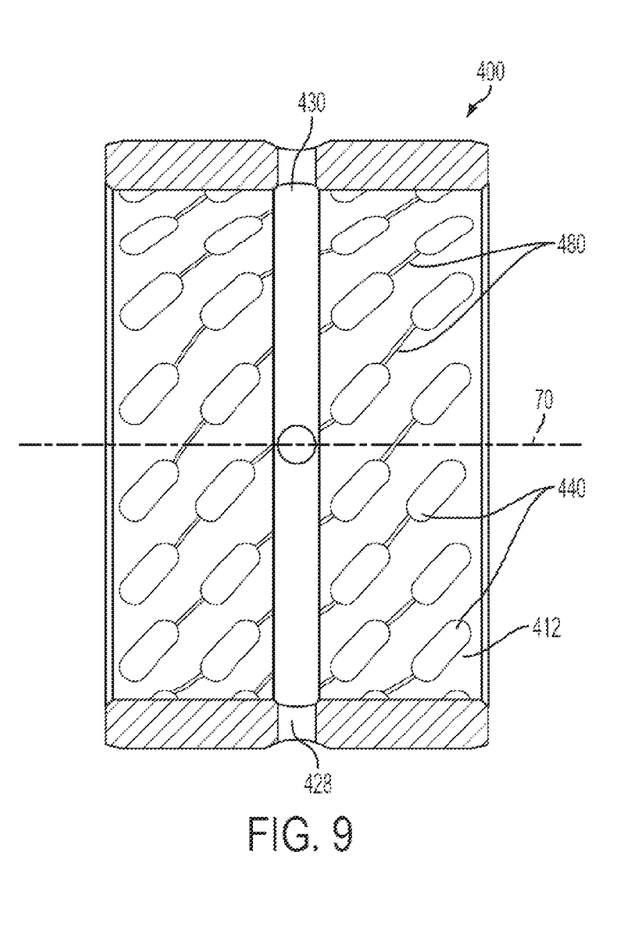
FIG. 9 is a front sectional view of another alternative embodiment of a sleeve bearing in accordance with the present disclosure.

FIG. 9 shows another alternative embodiment of a sleeve bearing 400. It should be understood that, unless otherwise noted, the sleeve bearing 400 includes substantially identical features as those features described above with respect to the sleeve bearing 100 shown in FIGS. 3-6. Additionally, the sleeve bearing 400 includes at least one lubricant passage 480 formed in the inner surface 412 between an inner lubricant channel 430 and at least one of a plurality of lubricant reservoirs 440. The at least one lubricant passage 480 is formed in the inner surface 412 so as to provide fluid communication between the inner lubricant channel 430 and adjacent lubricant reservoirs 440. Additionally, lubricant passages 480 can provide fluid communication between adjacent lubricant reservoirs. In some embodiments, the depth of the lubricant passages 480 with respect to the inner surface 412 is substantially less than the depth of the lubricant reservoirs 440. In such embodiments as the sleeve bearing 400 in FIG. 9, lubricant entering lubricant orifices 428 can travel around the inner surface 412 through the inner lubricant channel 430, and travel on into the plurality of lubricant reservoirs 440 through the lubricant passages 480.

Figure 10A:
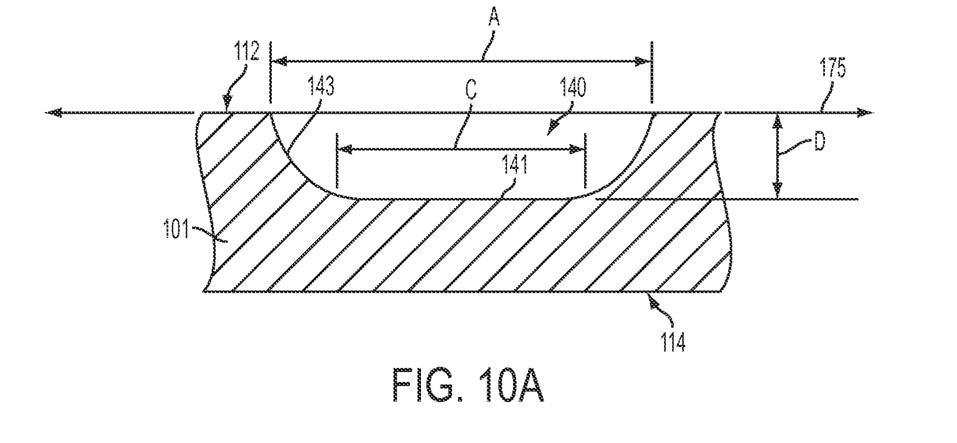
FIG. 10A is a sectional view of a lubricant reservoir in accordance with the present invention, the sectional view taken in a direction perpendicular to an elongation axis.
Figure 10B:
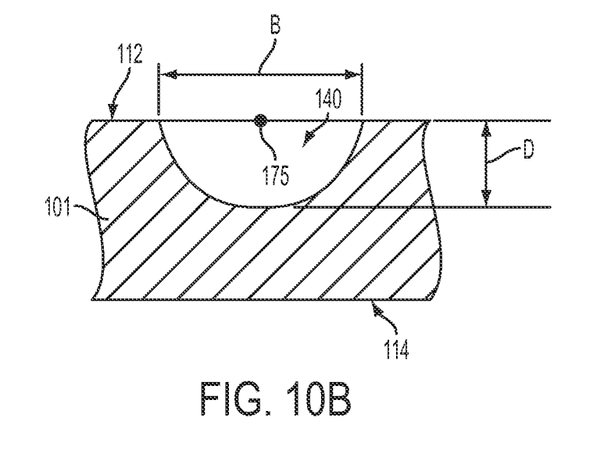
FIG. 10B is a sectional view of the lubricant reservoir of FIG. 10A, the sectional view taken along the elongation axis.
Figure 11A:
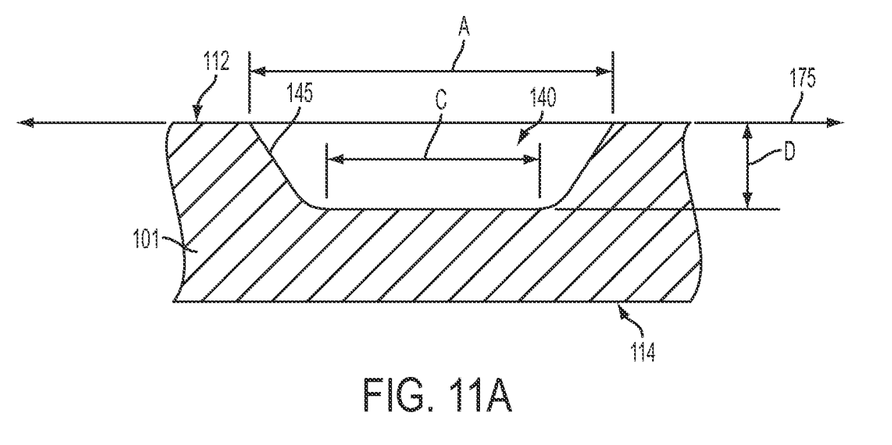
FIG. 11A is a sectional view of an alternative embodiment of a lubricant reservoir in accordance with the present disclosure, the sectional view taken in a direction perpendicular to an elongation axis.
Figure 11B:
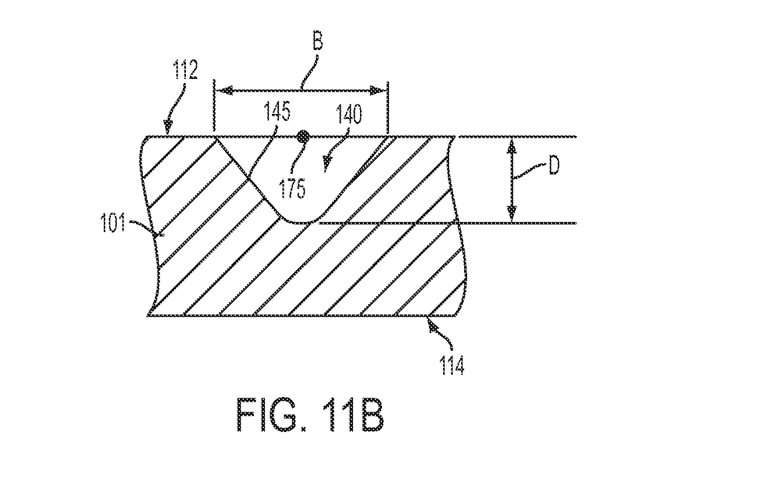
FIG. 11B is a sectional view of the lubricant reservoir of FIG. 11A, the sectional view taken along the elongation axis.

Referring now to FIGS. 10A and 10B, cross-sections of an individual lubricant reservoir 140 is shown. Although only one lubricant reservoirs 140 is shown in FIGS. 10A and 10B, it should be understood that each of the plurality of lubricant reservoirs can be substantially identical. FIG. 10A shows a cross-section taken in a direction perpendicular to the elongation axis 175, and FIG. 10B shows a cross-section taken along the elongation axis. The lubrication reservoir 140 has an overall length A that is substantially larger than an overall width B. Further, the lubrication reservoir 140 can have a reservoir base 141 at a overall depth D with respect to the inner surface 112. In some embodiments, the lubrication reservoir 140 can have a substantially consistent overall depth D at least along a base length C. In the embodiment illustrated in FIGS. 10A and 10B, reservoir walls 143 can be curved. In the alternative embodiment shown in FIGS. 11A and 11B, reservoir walls 145 can be substantially flat or planar.

Figure 12:
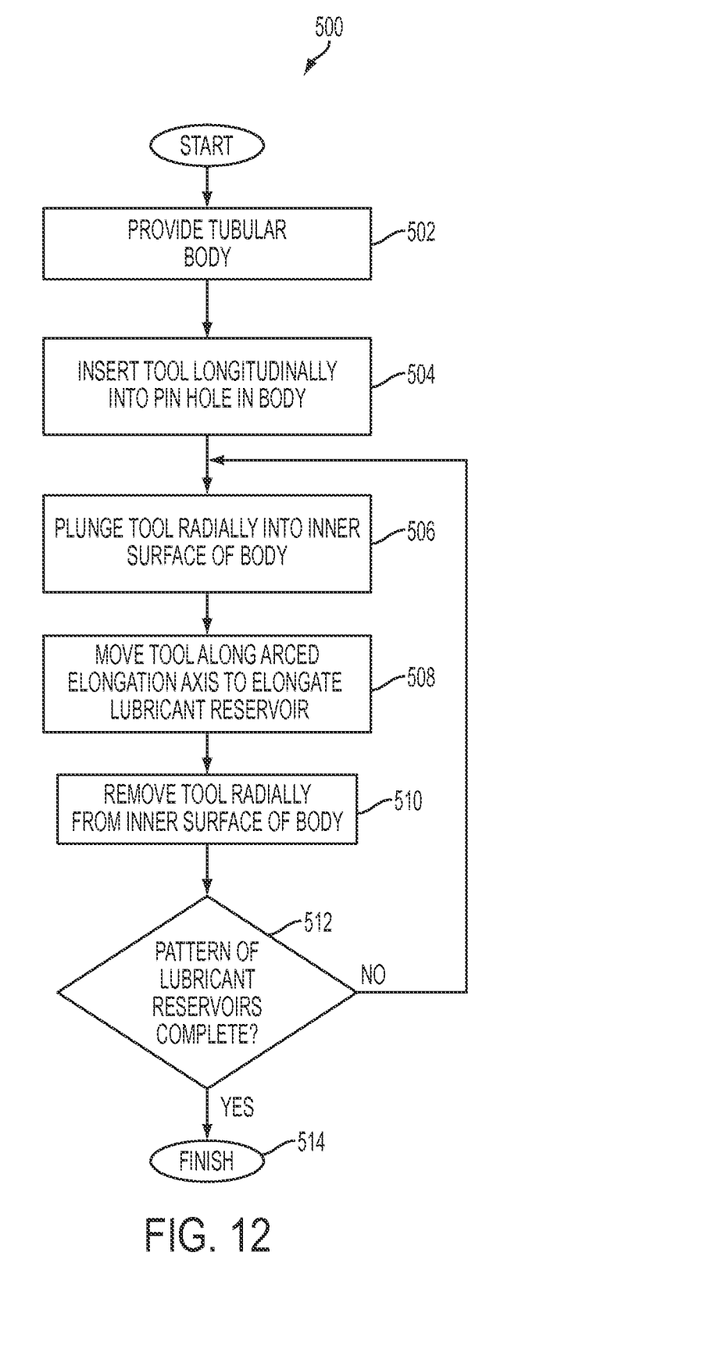
FIG. 12 is a flow chart depicting a method of forming a sleeve bearing in accordance with the present disclosure.

FIG. 12 illustrates a flow chart of a method 500 of forming the sleeve bearing 100. The method includes providing a tubular body at 502. As described above with respect to the sleeve bearing 100, the tubular body 101 can include a cylindrical inner surface 112 disposed annularly around a longitudinal axis 70 and surrounding a pin hole 102. The body 101 can also include a cylindrical outer surface 114 disposed radially outward from and substantially concentric with the inner surface 112. The body 101 can include a first side surface 116 and a second side surface 118 that each extend between the inner surface 112 and the outer surface 114. The body 101 can include a first inner edge 120 defined along a first inner interface between the first side surface 116 and the inner surface 112, and a second inner edge 122 defined along a second inner interface between the second side surface 118 and the inner surface. The method 500 can also include inserting a tool axially into the pin hole 102 at 504. In some embodiments, it is contemplated that the tool is a live tool, i.e., a rotary cutting tool that can be powered by a motor or other power source. Additionally, if a live tool is used, the tool can have a fully curved tip, such as could be used to form the lubricant reservoir shown in FIGS. 10A and 10B, or a v-shaped tool with a radius tip, such as could be used to form the lubricant reservoir shown in FIGS. 11A and 11B. The method 500 includes plunging the tool radially into the inner surface 112 of the body 101 at 506. The tool can be stopped at a pre-designated depth into the body 101 with respect to the inner surface 112. The method 500 includes moving the tool along an arced elongation axis 175 so as to elongate the lubricant reservoir 140 while maintain a reservoir depth at 508. The method 500 includes removing the tool radially out of the inner surface 112 at 510. At 512, the steps at 506, 508, and 510 can be repeated if an interrupted pattern of a plurality of elongate lubricant reservoirs is not yet complete, and can finish at 514 if the interrupted pattern of a plurality of elongate lubricant reservoirs is complete. It is contemplated herein that the tool can be controlled using computer numerical control (CNC). In such embodiments, a CNC machine equipped with live tooling can be programmed to repeatedly form the elongate lubricant reservoirs as desired for a particular pattern. Using the CNC equipment, the arched axis is at least partially arced about and along the longitudinal axis on the inner cylindrical surface in a non-helical manner.

While the arrangement is illustrated in connection with a hydraulic excavator, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

The industrial application of the sleeve bearing as described herein should be readily appreciated from the foregoing discussion. The present disclosure can be applicable to any machine that utilizes linkage pin joints including sleeve bearings. In machines including pin joints, the bearings and pins are exposed to high loads and stresses and are vulnerable to excessive wear and damage.

The present disclosure, therefore, can be applicable to many different machines and environments. The sleeve bearings described herein including interrupted and distributed patterns of lubricant reservoirs contain no overlap of adjacent reservoirs that can lead to sharp corners that tend to concentrate stress and lead to part failure. Instead, the described arrangements of lubricant reservoirs have smooth transitions between features and reduce sharp features. The result is a bearing/pin interface that balances contact stresses and balances the distribution of load across a large area of the inner surface, while still providing adequate lubrication to the interface. Further, the substantially uniform depth of each individual lubricant reservoir allows for more ready removal of lubrication from the entire length of reservoir while the pin rotates within the sleeve bearing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:
1. A sleeve bearing for a pin joint, the sleeve bearing comprising:
a tubular body having an inner portion, an outer portion, a first side portion, and a second side portion;
a substantially cylindrical inner surface defined on the inner portion, the inner surface disposed annularly about a longitudinal axis;
a substantially cylindrical outer surface defined on the outer portion, the outer surface disposed radially outward from and concentric with the inner surface;
a first side surface defined on the first side portion and extending between the inner surface and the outer surface;
a second side surface defined on the second side portion and extending between the inner surface and the outer surface;
a first inner edge defined along a first inner interface between the first side surface and the inner surface;
a second inner edge defined along a second inner interface between the second side surface and the inner surface such that the inner surface extends between the first inner edge and the second inner edge along the longitudinal axis; and
a plurality of elongate lubricant reservoirs formed into the inner surface, the lubricant reservoirs being elongated along the same elongation axis, the plurality of elongate lubricant reservoirs forming a first set of a plurality of elongate lubricant reservoirs arranged along and spaced away from each other along the elongation axis, wherein the axis is at least partially arced about the longitudinal axis on the inner cylindrical surface in a non-helical manner;
wherein a reservoir orientation angle defined between the elongation axis and the first inner edge is in a range between 0 degrees and 90 degrees; and
wherein the plurality of lubricant reservoirs are disposed in an interrupted pattern annularly around the inner surface such that a portion of the inner surface along the longitudinal axis between the first inner edge and the second inner edge is uninterrupted by any of the plurality of lubricant reservoirs.

2. The sleeve bearing of claim 1, wherein the reservoir orientation angle is in a range between about 15 degrees and about 75 degrees.

3. The sleeve bearing of claim 1, wherein the reservoir orientation angle is in a range between about 30 degrees and about 60 degrees.

4. The sleeve bearing of claim 1, wherein the reservoir orientation angle is about 45 degrees.

5. The sleeve bearing of claim 1, wherein a portion of the inner surface is uninterrupted by any of the plurality of lubricant reservoirs along an inner circumference of the inner surface, the inner circumference being substantially aligned with the first and second inner edges.

6. The sleeve bearing of claim 1, further comprising at least one lubricant orifice formed through the body between the outer surface and the inner surface.

7. The sleeve bearing of claim 6, further comprising:
an inner lubricant channel formed into the inner surface, the inner lubricant channel aligned substantially along an inner circumference of the inner surface, the inner circumference being substantially aligned with the first and second inner edges;
wherein the at least one lubricant orifice is formed through the body between the outer surface and the inner lubricant channel so as to provide fluid communication between the outer surface and the inner lubricant channel.

8. The sleeve bearing of claim 7, further comprising at least one lubricant passage formed in the inner surface between the inner lubricant channel and at least one of the plurality of lubricant reservoirs so as to provide fluid communication between the inner lubricant channel and at least one of the lubricant reservoirs.

9. The sleeve bearing of claim 7, further comprising:
an outer lubricant channel formed into the outer surface and concentric with the inner lubricant channel, the outer lubricant channel aligned substantially along an outer circumference of the outer surface, the outer circumference being substantially aligned with a first outer edge defined along a first outer interface between the first side surface and the outer surface;
wherein the at least one lubricant orifice is formed through the body between the outer lubricant channel and the inner lubricant channel so as to provide fluid communication between the outer lubricant channel and the inner lubricant channel.

10. A sleeve bearing for a pin joint, the sleeve bearing comprising:
a tubular body having an inner portion, an outer portion, a first side portion, and a second side portion;
a substantially cylindrical inner surface defined on the inner portion, the inner surface disposed annularly about a longitudinal axis;
a substantially cylindrical outer surface defined on the outer portion, the outer surface disposed radially outward from and concentric with the inner surface;
a first side surface defined on the first side portion and extending between the inner surface and the outer surface;
a second side surface defined on the second side portion and extending between the inner surface and the outer surface;
a first inner edge defined along a first inner interface between the first side surface and the inner surface;
a first outer edge defined along a first outer interface between the first side and the outer surface;
a second inner edge defined along a second inner interface between the second side surface and the inner surface such that the inner surface extends between the first inner edge and the second inner edge along the longitudinal axis;
at least one lubricant orifice formed through the body between the outer surface and the inner surface;
an inner lubricant channel formed into the inner surface, the inner circumference being substantially aligned with the first and second inner edges;
an outer lubricant channel formed into the outer surface and concentric with the inner lubricant channel, the outer circumference being substantially aligned with the first outer edge;
at least one lubricant orifice formed between the outer lubricant channel and the inner lubricant channel so as to provide fluid communication between the outer lubricant channel and the inner lubricant channel; and
a plurality of elongate lubricant reservoirs formed into the inner surface, the lubricant reservoirs being elongated along the same elongation axis, the plurality of elongate lubricant reservoirs forming a first set of a plurality of elongate lubricant reservoirs arranged along and spaced away from each other along the elongation axis, wherein the axis is at least partially arced about the longitudinal axis on the inner cylindrical surface in a non-helical manner;
wherein a reservoir orientation angle defined between the elongation axis and the first inner edge is in a range between 0 degrees and 90 degrees; and
wherein the plurality of lubricant reservoirs are disposed in an interrupted pattern annularly around the inner surface such that a portion of the inner surface along the longitudinal axis between the first inner edge and the second inner edge and a portion of the inner surface along an inner circumference of the inner surface is uninterrupted by any of the plurality of lubricant reservoirs.

11. The sleeve bearing of claim 10, wherein the reservoir orientation angle is in a range between about 15 degrees and about 75 degrees.

12. The sleeve bearing of claim 10, wherein the reservoir orientation angle is in a range between about 30 degrees and about 60 degrees.

13. The sleeve bearing of claim 10, wherein the reservoir orientation angle is about 45 degrees.

14. The sleeve bearing of claim 10, further comprising at least one lubricant passage formed in the inner surface between the inner lubricant channel and at least one of the plurality of lubricant reservoirs so as to provide fluid communication between the inner lubricant channel and at least one of the lubricant reservoirs and wherein the at least one of the plurality of lubricant reservoirs is blind.

* * * * *